Nov. 28, 1933.                    W. HÄHNLE                        1,936,939

VIBRATION TRANSMISSION SYSTEM

Filed Feb. 29, 1932

INVENTOR
WALTER HÄHNLE
BY
ATTORNEY

Patented Nov. 28, 1933

1,936,939

UNITED STATES PATENT OFFICE 1,936,939

VIBRATION TRANSMISSION SYSTEM

Walter Hähnle, Berlin-Siemensstadt, Germany, assignor to Telefunken-Gesellschaft fur Drahtlose Telegraphie m. b. H., Berlin, Germany, a corporation of Germany Application February 29, 1932, Serial No. 595,841, and in Germany May 19, 1931

13 Claims. (Cl. 181—31)

The invention is concerned with arrangements in which forces are transmitted to or caused to act on surfaces. More specifically the invention is concerned with arrangements in which it is desirable to insure the transmission of the forces under co-phasic conditions for all points throughout such a surface. The invention relates particularly to loudspeakers comprising large and thin diaphragms.

The condition of phase coincidence is readily fulfillable for low and medium frequencies. However, in the case of high frequencies great difficulties arise inasmuch as diaphragms, whenever they are larger than a certain critical limit, fail to oscillate any longer in piston fashion, indeed, internal oscillations arise therein. This drawback can be obviated by using small diaphragms, but these are unsatisfactory for the reason that the radiating of sound is correspondingly limited in volume.

Another method of precluding the arising of harmful oscillations consists in making the diaphragms of greater thickness. However, this results in an undesirable increase in the mass of the diaphragm. Also with other forms of construction satisfactory solutions of the problem have so far not been obtained.

According to the present invention co-phasic transmission or application of forces to surfaces is attained by disposing intermediate transmission means possessing dissimilar speeds of propagation between the force generator and the surface, and by connecting the surface with such points of the transmission means as possess the same phase.

The possibility of driving the diaphragm from different points is known in the art. For instance, one known arrangement comprises a source of force from which tensioned wire cords are brought to different points of the diaphragm. Owing to the dissimilarity of the various cords, the same drawbacks are here caused to arise as in the case of the diaphragms driven or actuated from a single point. It is only by making the intermediate linking means, in this case the cords, of different propagation speeds that phase coincidence is insured.

Figure 1:
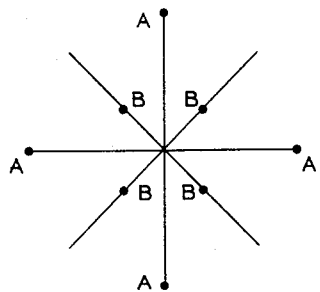
Figure 2:
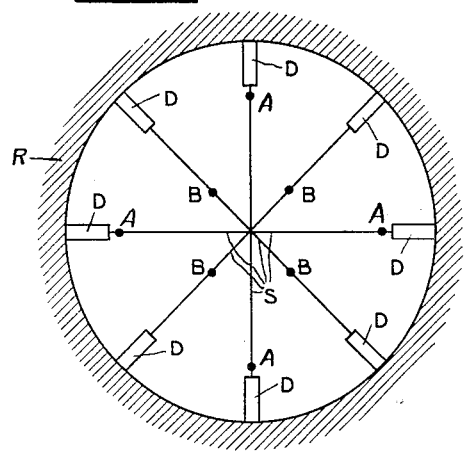
Figure 3:
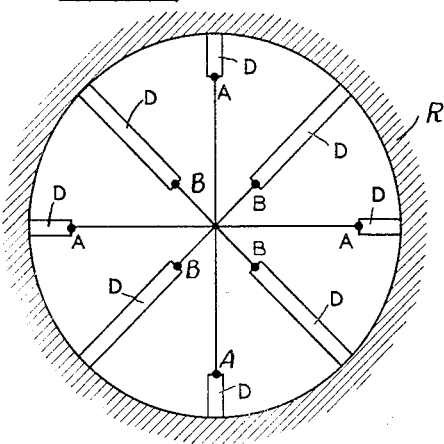
Figure 5:
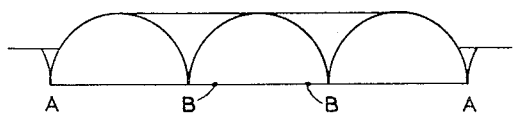
Figure 4:
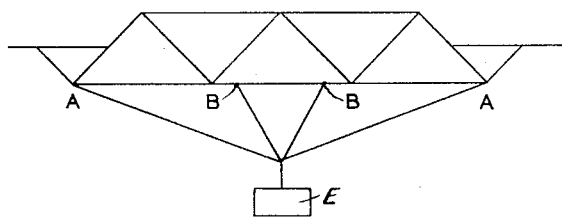

In the accompanying figures several embodiments of the basic idea of the invention are shown, Figs. 1–3 illustrating forms of construction of the intermediate transmitter means, Figs. 4 and 5 cross sectional views of diaphragms.

Fig. 1 illustrates an intermediate transmission link which consists of rodlets intercrossing starfashion. These rods are so proportioned that, as already indicated, they possess different speeds of propagation, in fact, the dimensions in this embodiment have been so chosen that the rods terminating in points A have a higher speed of propagation than the other rods. The oscillations which are to be transferred to the diaphragm come to act at the center of the system whence they propagate to the different rod arms. At the very instant when they arrive at points A, they may be supposed to have reached points B in the other rods on account of the lower speed of propagation. All of the points A and B, as a result, are caused to oscillate under co-phasic conditions in spite of dissimilar distance from the center. The same situation therefore holds true also for the diaphragm which is fixedly connected with the said points. Now, it is readily feasible to provide such a large number of different or dissimilar intermediary links that the points of action upon the diaphragm are at sufficiently close proximity to one another in order that phase coincidence throughout the entire surface is obtained of necessity or by compulsion.

In order to insure satisfactory results it is necessary that the intermediary linking means should involve low damping. At their terminal or attaching points, for instance, at the places where they are rigidly associated with the loudspeaker casing, damping means are provided which serve the purpose of preventing reflections so that the production of standing waves is thereby precluded. The different speeds of propagation in the rods are readily insurable by the use of different materials or by different dimensions of the rods, especially by differences in cross-section.

In Fig. 2 a particularly advantageous embodiment is shown to which the fundamental considerations just made are applicable also. The transfer linking means consist here in a system of tensioned cords S. By the aid of bands D the same is attached to a frame R which is preferably circular in form. Excitation is again effected from the center, and also in this instance points of equal phase are designated by A and B. Damping is produced by the tie straps or bands D of suitable damping material. The cord material to be preferably used is metal. In order that a certain desirable ratio between mass and elasticity of the cords may be secured, supplementary masses may be provided or attached whenever this seems desirable.

Fig. 3 shows the same embodiment again, though in a somewhat altered form. In this instance, the cords and the bands are so proportioned that points of like phase will coincide with the terminal or base points of the cords.

The properties and effects of means of the kind hereinbefore disclosed may be investigated by the air of "substitution pictures" so that the conditions are pre-calculable and can be chosen at will. The dimensioning of the elements including the intermediary links, may be so chosen that the whole arrangement acts like a filter, more particularly like a low-pass filter. The dimensioning may be done in a number of ways such as by varying the cross sectional area of the links to give each link the necessary mass and stiffness.

Figs. 4 and 5 show two embodiments of diaphragms which have proved particularly suitable, Fig. 4 being a cross section through a paper diaphragm for a high pitch loudspeaker having a frequency range extending between 800 and 8,000 cycles. Fig. 5 is a cross section through a diaphragm made of light metal. The points of action of these circular diaphragms, in line with the foregoing illustrations, are denoted at A and B. Fig. 4 also shows diagrammatically the manner in which a driving unit E is connected to the diaphragm by means of a transmission system in accordance with the invention.

Both forms of construction are intended to bring out fundamental features, and for the sake of simplicity they are shown with only two different speeds of propagation of the intermediary transmission links. For the purpose of securing greater uniformity of diaphragm motion, however, a closer subdivision is mostly recommendable.

As can be seen from what precedes, the basic idea of the invention is realizable in widely different ways. For instance, intermediary transmission link means may be used which are subjected to longitudinal oscillations, as the embodiment shown in Fig. 1. However, it is of essentially greater advantage to use arrangements, as mentioned at the outset, which are subject to transversal vibrations.

In connection with the adoption of the idea underlying the invention, as will be seen, it is feasible to use large and thin diaphragms in which a condition of phase coincidence is insurable safely for all frequencies to be considered in practice.

What is claimed is:

1. A transmission system adapted to insure cophasic transmission of forces onto surfaces, such as loudspeaker diaphragms from a force generator by means of intermediary transmission linking means, with this characteristic feature that between the force generator and the surface, intermediary transmission linking means of dissimilar propagation speed are interposed, and that the surface is connected to such points of the different links as present phase coincidence.

2. A transmission system according to claim 1, with this characteristic feature that between the intermediary transmission links and the points of attachment thereof damping means are provided, for the purpose of precluding the production of stationary waves.

3. A transmission system according to claim 1, characterized by the use of oscillable rigid, preferably rod-shaped, transmission links.

4. A transmission system according to claim 1, characterized by the use of tensioned cords to act as transmission links.

5. A transmission system according to claim 1, with this characteristic feature that the transmission links are formed by cords which are tensioned or stretched out in a preferably circular frame in radial direction.

6. In acoustic apparatus a transmission system adapted to be connected between a source of mechanical vibrations and a diaphragm surface comprising a plurality of portions having dissimilar propagation speeds.

7. In acoustic apparatus a transmission system adapted to be connected between a source of mechanical vibrations and a diaphragm surface comprising a plurality of links connected to different portions of said surface, said links having dissimilar propagation speeds.

8. In acoustic apparatus a transmission system adapted to be connected between a source of mechanical vibrations and a diaphragm surface comprising a plurality of different length links connected to said surface, said links having dissimilar propagation speeds.

9. In acoustic apparatus a transmission system adapted to be connected between a source of mechanical vibrations and a diaphragm surface comprising a plurality of links of different physical properties and of dissimilar propagation speeds, said links being connected to different points on said surface.

10. In acoustic apparatus a transmission system adapted to be connected between a source of mechanical vibrations and a diaphragm surface comprising means of dissimilar propagation speeds for applying vibrations to a plurality of different points on said surface so that the vibrations reaching said surface are in phase, said points being at different distances from said source of mechanical vibrations.

11. Acoustic apparatus comprising a source of mechanical vibrations, a diaphragm, and a plurality of means of different propagation speeds for transmitting vibrations from said source through a plurality of different and separate paths to said diaphragm so that phase coincidence throughout said diaphragm is obtained.

12. Acoustic apparatus comprising a source of mechanical vibrations, a diaphragm, and a transmission system including a plurality of links connected between said source and said diaphragm, said links being so dimensioned that said transmission system functions as a filter for passing substantially only predetermined frequencies.

13. The method of driving a diaphragm from a source of mechanical vibrations which consists of transferring vibrations from said source to a plurality of different points on said diaphragm through a plurality of separate and independent paths, and selecting said paths so that the rate of propagation through the different paths differs in a degree such that the vibrations reach the different points on said diaphragm in phase.

WALTER HÄHNLE.